Nov. 26, 1929.   T. P. RICHARDSON, JR   1,737,520
DIRECTORY BOARD
Filed Feb. 3, 1928   3 Sheets-Sheet 3
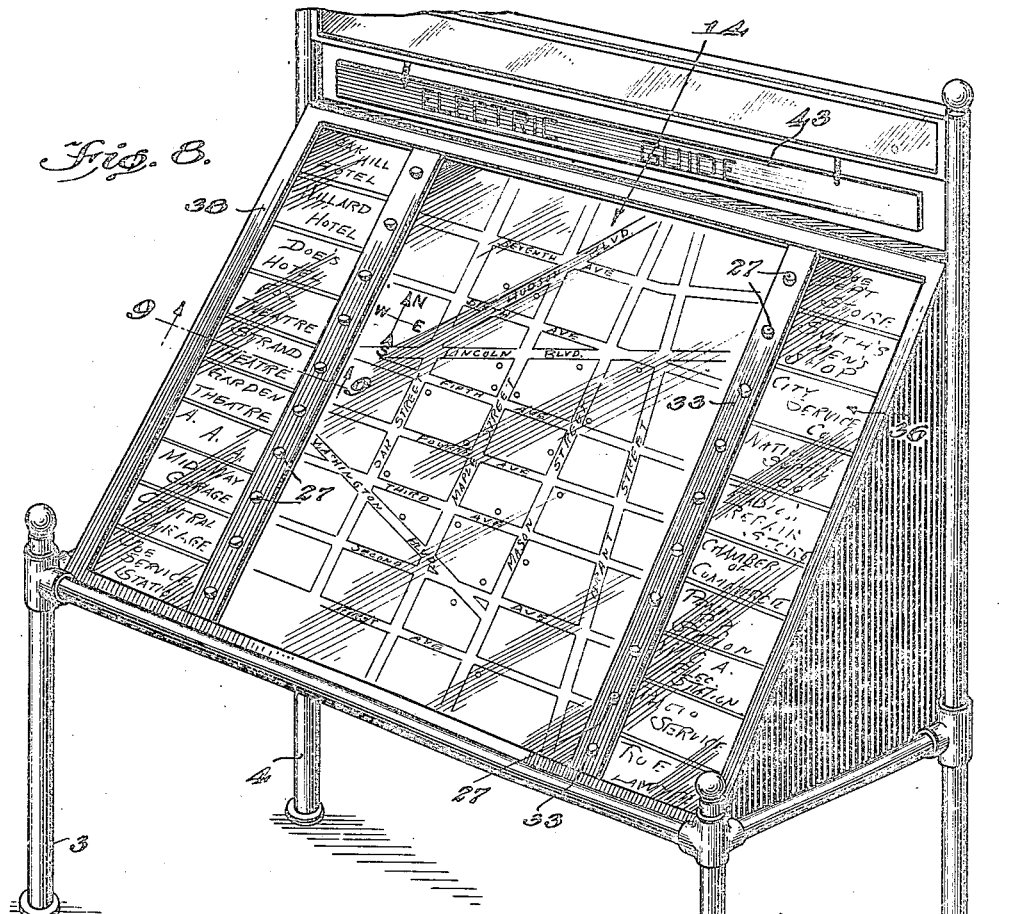
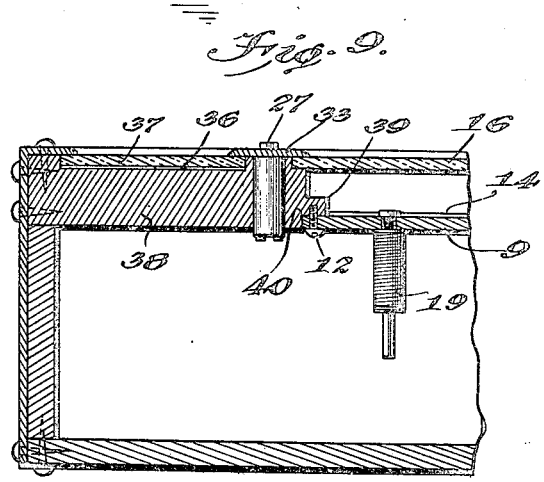
INVENTOR
T. P. Richardson, Jr.,
BY
ATTORNEYS Patented Nov. 26, 1929

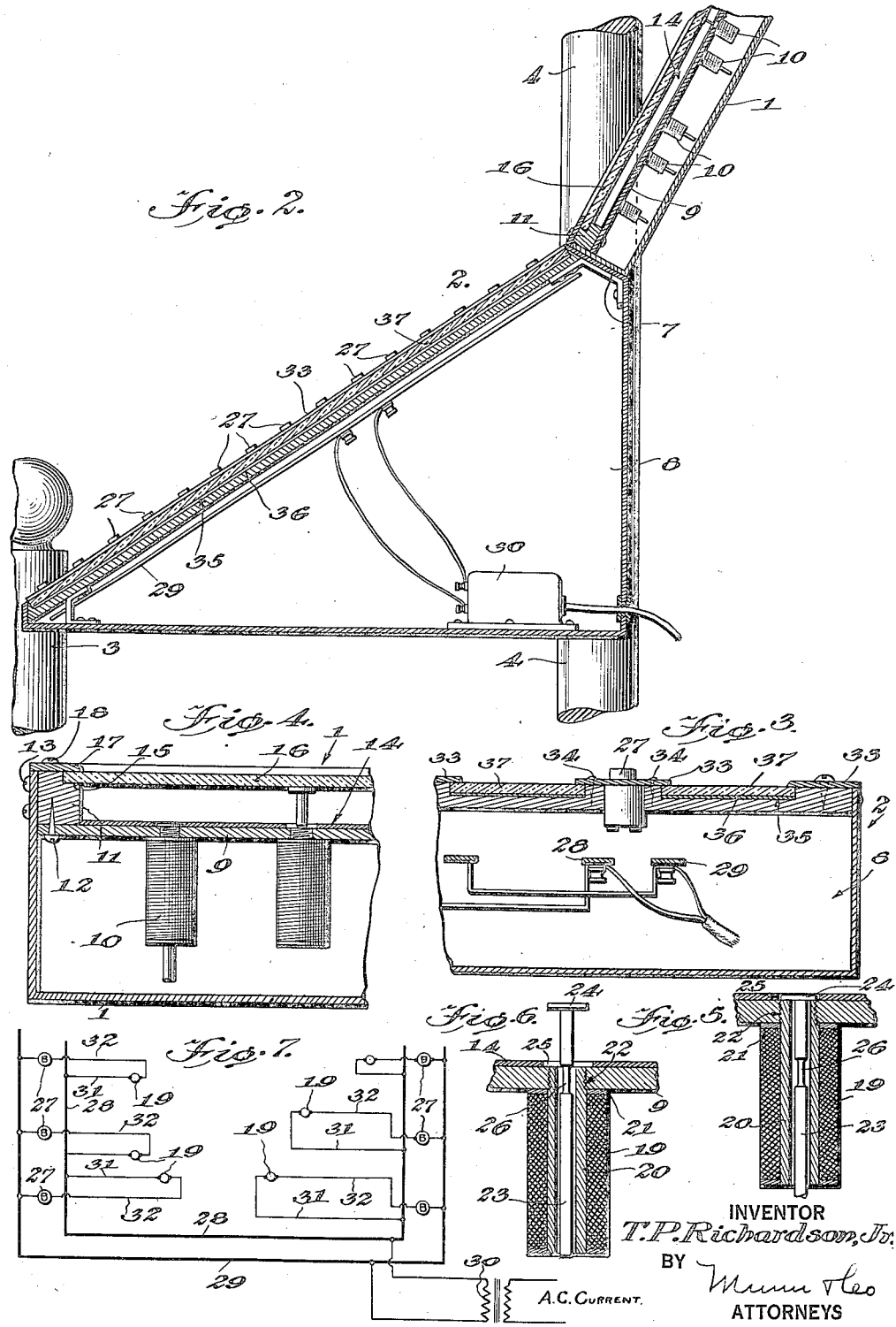

1,737,520

UNITED STATES PATENT OFFICE

THOMAS P. RICHARDSON, JR., OF TRYON, NORTH CAROLINA, ASSIGNOR TO ELECTRIC DIRECTORY CORPORATION, OF TRYON, NORTH CAROLINA, A CORPORATION OF DELAWARE

DIRECTORY BOARD

Application filed February 3, 1928. Serial No. 251,602.

This invention relates to improvements in directory boards, and it consists of the constructions, combinations and arrangements herein described and claimed.

An object of the invention is to provide a directory board in which the principal functions are performed electrically, the arrangements, as will presently appear, being such that the person requiring information of any specific character may quickly obtain the latter by merely pressing a button.

Another object of the invention is to provide a directory board primarily adaptable to city maps, the specific purpose in that connection being to enable a stranger to quickly locate a desired place upon the map thus to expeditiously guide him to his destination.

Another object of the invention is to provide a directory board of an attractive nature, not only serving the fundamental purposes herein disclosed, but also serving as a desirable medium for advertising matter.

Another object of the invention is to incorporate a novel form of solenoid by means of which an audible signal is produced.

Other objects and advantages appear in the following specification, reference being had to the accompanying drawings in which:—

Figure 2 is a longitudinal section taken substantially on the line 2—2 of Figure 1.

Figure 3 is a detail cross section taken on the line 3—3 of Figure 1.

Figure 4 is a detail cross section taken on the line 4—4 of Figure 1.

Figure 5 is a sectional view of one of the solenoids, the core being in the retracted position.

Figure 6 is a similar view of the solenoid, the core being in the extended position.

Figure 7 is a fragmentary diagram of the electrical wiring.

Figure 8 is a perspective view of another type of directory board.

Figure 9 is a detail cross section taken on the line 9—9 of Figure 8.

Figure 1:
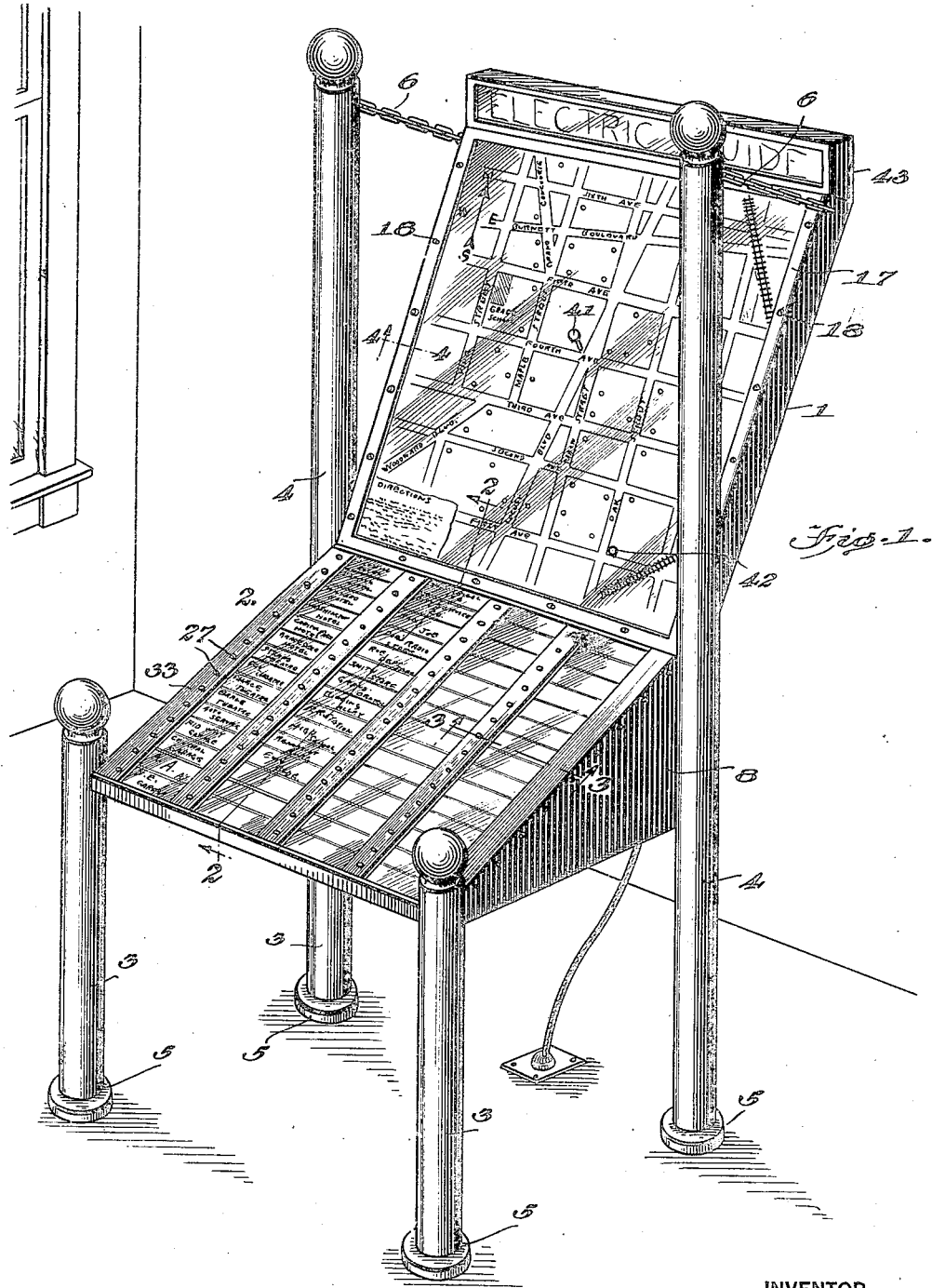
Figure 1 is a perspective view of one type of directory board.

The experience of being at a loss for specific information concerning the location of business houses, theaters and the like is not confined to persons who are strangers in a city. It is a common occurrence that the natives of a city often find it necessary to make inquiries concerning the whereabouts of particular places.

Those who have comparatively few occasions to frequent the downtown portions of a city almost invariably find it necessary to either request directions as to their way or how to reach a certain place. Although the directory is intended as an aid to the latter class, it is primarily designed to assist strangers to orient themselves and determine, by their own efforts, the shortest route to a particular locality.

With the latter service in mind, the directory board is herein disclosed as the repository of the map of a portion of a city. It is not necessary to merely confine the map to a portion of a city for, obviously, the map may be as large and extensive as necessary. The map should be on a sufficiently large scale to enable the person seeking information to easily trace his route.

As an auxiliary and natural concomitant to the map is a more or less extensive list of business and other houses. This list may be confined to printed names. But, what is more desirable, the list should be supplemented by pictures of the business houses whenever possible, so that the person seeking his direction to a given place may readily recognize such place from his recollection of the picture when arriving thereat.

Attention is directed to the drawings: Figure 1 illustrates an arrangement which, for such purposes, may be regarded as preferable to the arrangement in Figure 8. The latter is condensed in form and is adaptable to localities smaller than those for which the form in Figure 1 is designed.

A frame provides the necessary support for a map cabinet 1 and what is herein known as the keyboard 2. The frame comprises a pair of relatively short standards 3 and a pair of relatively long standards 4. These, in practice, must be suitably braced and may be ornamented in any desired manner.

The mode of securing the frame may be varied. Figure 1 illustrates the use of flanges 5 through which suitable fastening means may be passed to the floor. It is immaterial how the frame is fastened. The frame may be stood in position without fastening.

Chains 6 or other appropriate connectors, support the upper portion of the map cabinet 1 at a predetermined inclination to the frame. The particular inclination determined upon will be one that renders the map most easily readable. The inclined position of the map cabinet has an additional, and perhaps more important purpose, in that the action of gravity may be taken advantage of in returning the cores of certain solenoids which are used as audible signals.

The cabinet 1 is secured in the foregoing position upon the upper edge 7 of a casing 8. This casing constitutes part of the foregoing keyboard 2. It houses certain mechanism coacting with the keyboard. The mode of securing the cabinet 1 to the upper edge 7 may be varied. Screw and strap fastenings, or the equivalents thereof, may be employed as will be found most desirable.

It is intended that the map cabinet 1 shall remain fixed in position upon the frame. The chains 6 might be replaced by some more rigid connection. It is to be noted that the cabinet 1 is quite shallow. It needs be only sufficiently deep to accommodate a partition 9 and the depending solenoids 10.

This partition is carried by side cleats 11 (Figure 4) to which it is secured by suitable means 12. The cleats are attached to the sides of the cabinet 1 as at 13. The partition 9 provides a table to which a map 14 is applied. Rabbets 15 in the cleats 11 receive the edges of a glass or other transparent pane 16. Strips 17, secured to the cleats 11 at 18, hold the pane in position.

As has been stated already, the parition 9 supports the solenoids 10. These occupy the chamber between the partition and back of the map cabinet and are thus concealed from view. The description of the construction of one of the solenoids will suffice for all and Figures 5 and 6 are referred to for the details.

The wire winding or coil 19 is applied to a sleeve 20, one end of which protrudes beyond the adjacent head 21 of the solenoid and is externally threaded so that it may be screwed into a threaded opening 22 in the partition and thus effect the mounting of the solenoid. The head 21 serves as an abutment, limiting the distance to which the protruding end of the sleeve may be screwed into the opening. The partition 9 is made of a non-metallic material. The sleeve 20 is also made of non-metallic material.

An iron plunger 23 is reciprocable within the sleeve 20. A relatively large head 24 on the upper exposed extremity of the plunger serves to limit the gravitation of the plunger within the sleeve and as a striker against the under side of the pane 16 when the solenoid is energized. The head 24 is preferably given a contrasting color so that the location thereof may be conspicuous. The head drops into a hole 25 in the map 14 when the solenoid is inactive.

A constriction 26 in the plunger 23 relatively near the head 24, causes a peculiar action of the solenoid that is adaptable to a device of the present character in particular. The constriction serves to isolate the main body of the plunger so that the latter alone, acts as the magnetizable core under the action of alternating current. A further effect of the constriction is to lighten the plunger so that it vibrates more readily.

The action of the plunger is this: As soon as the solenoid is energized, that portion of the plunger 23 projecting beyond the bottom of the sleeve 20 is attracted and the plunger is caused to move into the sleeve according to the characteristic solenoid action. The position of the constriction 26 is so gauged with respect to the head 24 that the former will extend above the end of the winding 19 when the head strikes the pane. By virtue of the fact that alternating current will be used for the operation of the solenoid a rapid vibration of the plunger 23 will follow in consonance with the cycles or alternations of the current.

It is to be noted that the provision of the constriction 26 presents a metallic path of reduced volume for the magnetic lines of force when the plunger assumes the position in Figure 6. The effect of the constriction might be described as weakening. In any event, the constriction has the result of causing the action of the fluctuating current to be confined to that portion of the plunger within the coil. The alternations of the current occur in rapid succession so that the head 24 is caused to tap continuously on the under side of the pane.

Another effect of the particular form of plunger is to span the distance between the map and the under side of the pane. The result of the initial energization of the winding 19 is to project the plunger a sufficient distance to bring the head 24 into contact with the pane. The constriction 26 serves to isolate, so to speak, the main body of the plunger within the sleeve 20, such body then acting as an ordinary plunger would, the head 24, however, being suspended in the extended position.

One of the solenoids will be located at each designated place on the map 14. There will be a push button 27 for each solenoid. The wiring diagram is illustrated in Figure 7 to which attention is directed. The busses 28—29 are connected with the respective poles of a transformer 30. The connections 31 and 32 of each solenoid 19 are joined with said busses, the push buttons being interposed. Depression of a push button will complete a circuit through the solenoid with the result described.

The casing 8 of the keyboard 2 contains the busses as well as the source of current. The keyboard 2 is divided into upright columns by facing strips 33 (Fig. 3). These strips have openings through which the push buttons 27 project. The strips are attached as at 34, but they may be removed without disturbing the push buttons. The edges of the strips project beyond the edges of recesses 35 in the keyboard. Cards 36 bearing appropriate advertising matter, are laid in the recesses where they are protected by transparent panes 37. The edges of the strips 33 hold the panes in place.

Reference is now made to Figures 8 and 9. The supporting frame is substantially like the one in Figure 1, corresponding reference numerals designating the standards. The map cabinet and keyboard are combined in a single indicating board 38. The map 14 is situated between lateral rows of advertising matter 36 and push buttons 27. The latter appear at openings in facing strips 33 as in the form of the invention already described.

As seen in Figure 9, the facing strip 33 serves to hold in position both the pane 16 above the map 14 and the pane 37 that covers the advertising card 36. The indicator board 38 has flanges 39, rabbeted at 40 to receive the partition 9 by which the solenoid is carried. The partition is secured by screws or equivalent means 12.

The operation is readily understood. A person, desiring information concerning the location of a certain store, for example, will approach the directory pictured in Figure 1 and consult the map 14. In order that the person may orient himself, the location of the directory is designated by a conspicuously colored pin or other marker 41. The directory is located at the corner of 4th Avenue and Locust Blvd. as indicated by the marker.

The store which the person desires to find is supposedly located on the corner of 1st Avenue and Oak St. This location is supplied with one of the solenoids 19 as designated by 42 in Figure 1. An examination of the lists on the keyboard 2 will disclose the advertisement of the store in quest. A depression of the accompanying button 27 will close the electrical circuit of the solenoid at the point 42 so that the head of the plunger of that solenoid will loudly tap the covering pane. The coloring of the head will aid in attraction attention.

It now becomes an easy matter to outline a course to the point sought. The advertising matter on the keyboard 2 may be supplemented by pictures A picture of the store will aid the person seeking the information to recognize the building when he reaches it.

It is deemed unnecessary to describe the action of the directory in Figure 8 inasmuch as it is identical with that already described. In practice, the solenoids 19 may be made quite small. The cost of manufacture is inconsiderable. Unlike lamp bulbs, the solenoids will not burn out in ordinary use and therefore need not be renewed. It is unnecessary to make adjustments of the solenoids in order to insure an audible signal as is the case when buzzers or tappers are employed.

The directory is well adapted for use in broad daylight. In this particular instance, the solenoids work to far better advantage than if electrical lamps were used to mark predetermined places. While on this subject, it is to be noted that the directory in both Figures 1 and 8 is supplemented at the top by a casing 43. Although the details thereof are not illustrated, this casing may be regarded as containing lamps which may be lighted to illuminate the directory at night. Such lamps may also be arranged to illuminate a sign advertising the directory.

While the construction and arrangement of the improved directory is that of a generally preferred form, obviously modifications and changes may be made without departing from the spirit of the invention or the scope of the claims.

I claim:—

1. A directory comprising a map, audible signal devices distributed among designated places on the map, electrical circuits embracing said devices, each circuit inluding a switch for the closure of the circuit and operation of a desired signal device, and a marker supplementing the map permitting orientation of the directory in reference to said latter devices.

2. A directory comprising a map, a pane located above the map, a solenoid situated at a designated place upon the map, said solenoid having a plunger, and means for completing an electrical circuit through the solenoid causing the plunger to strike the pane.

3. A directory comprising a map, a covering pane for the map, a solenoid having a plunger with a head, said head designating a specific location on the map, and means for completing an electrical circuit through the solenoid causing projection of the plunger and striking of the head against the pane.

4. A directory comprising a map, a covering pane spaced from the map, a solenoid, a source of alternating current and associated means for completing a circuit through the solenoid, and a plunger included in the solenoid having a head designating a specific location on the map and including a structure causing projection of the plunger so that the head traverses the space and strikes the pane, and vibration of the plunger during the continuity of the circuit.

5. A directory comprising a map having a hole at a designated place, a covering pane located above the map, a solenoid affixed behind the map having a plunger, said plunger having a head occupying the hole and identifying said place, and means for completing an electrical circuit through the solenoid causing projection of the plunger and striking of the head against the pane.

6. A directory comprising a cabinet having a partition, a map mounted upon the partition having a hole at a designated place, a pane disposed above the map, a solenoid having a coil and having a sleeve attached to the partition, a plunger for the solenoid having a constriction and having a head seated in the hole, and means for completing an alternating current circuit through the solenoid causing initial projection of the plunger and vibration of the head against the pane when the constriction assumes a position beyond the solenoid coil.

7. In a directory, a cabinet having a partition, a transparent pane, cleats to opposite sides of which the partition and pane are applied defining a space therebetween, a map applied to the partition being visible through the pane, a solenoid mounted upon the partition, and a plunger forming part of the solenoid being movable across the space into contact with the pane to attract attention to a place on the map designated by the location of the solenoid.

8. In a directory, a cabinet having a partition, a map applied to the partition, a pane located above the map, a solenoid mounted on the partition, a plunger forming part of the solenoid and designating a location upon the map, said plunger being engageable with the pane upon energization of the solenoid, and means upon which the cabinet is mounted in an inclined position permitting gravitation of the plunger to a retracted position.

9. A directory comprising a map cabinet, a solenoidal signal device mounted upon the cabinet including a movable indicating plunger, a keyboard having a switch, an electrical circuit embracing the switch and signal device, and a casing by which the keyboard is carried including an inclined upper edge to which the cabinet is applied to dispose the latter in an inclined position for the gravitation of the plunger while the signal device remains deenergized.

10. A directory comprising a frame, a map cabinet mounted upon the upper portion of the frame, a solenoidal signal device carried by the cabinet including a movable indicating plunger, a keyboard having a switch, an electrical circuit embracing the switch and signal device, and a casing mounted upon the lower portion of the frame carrying the keyboard and including an inclined upper edge to which the cabinet is applied in an inclined position with respect to the frame, permitting gravitation of the plunger.

11. In a directory, a casing, a keyboard mounted on the casing having a recess to receive a card, a covering pane fitted in the recess, strips attached to the keyboard having edges projecting over the recess to hold the pane down, one of the strips having a hole, a switch carried by the keyboard having a button protruding through the hole, and an electrical indicating device operable by the switch.

12. An indicating device comprising a wire coil, a sleeve upon which the coil is wound, one end of the sleeve protruding beyond the coil and being threaded for mounting, a core movable in the sleeve having a constriction near one end, and a head at said one end serving as a marker and tapper.

Signed at the city of Washington, in the District of Columbia this 30th day of January, A. D. 1928.

THOMAS P. RICHARDSON, Jr.